UNITED STATES PATENT OFFICE.

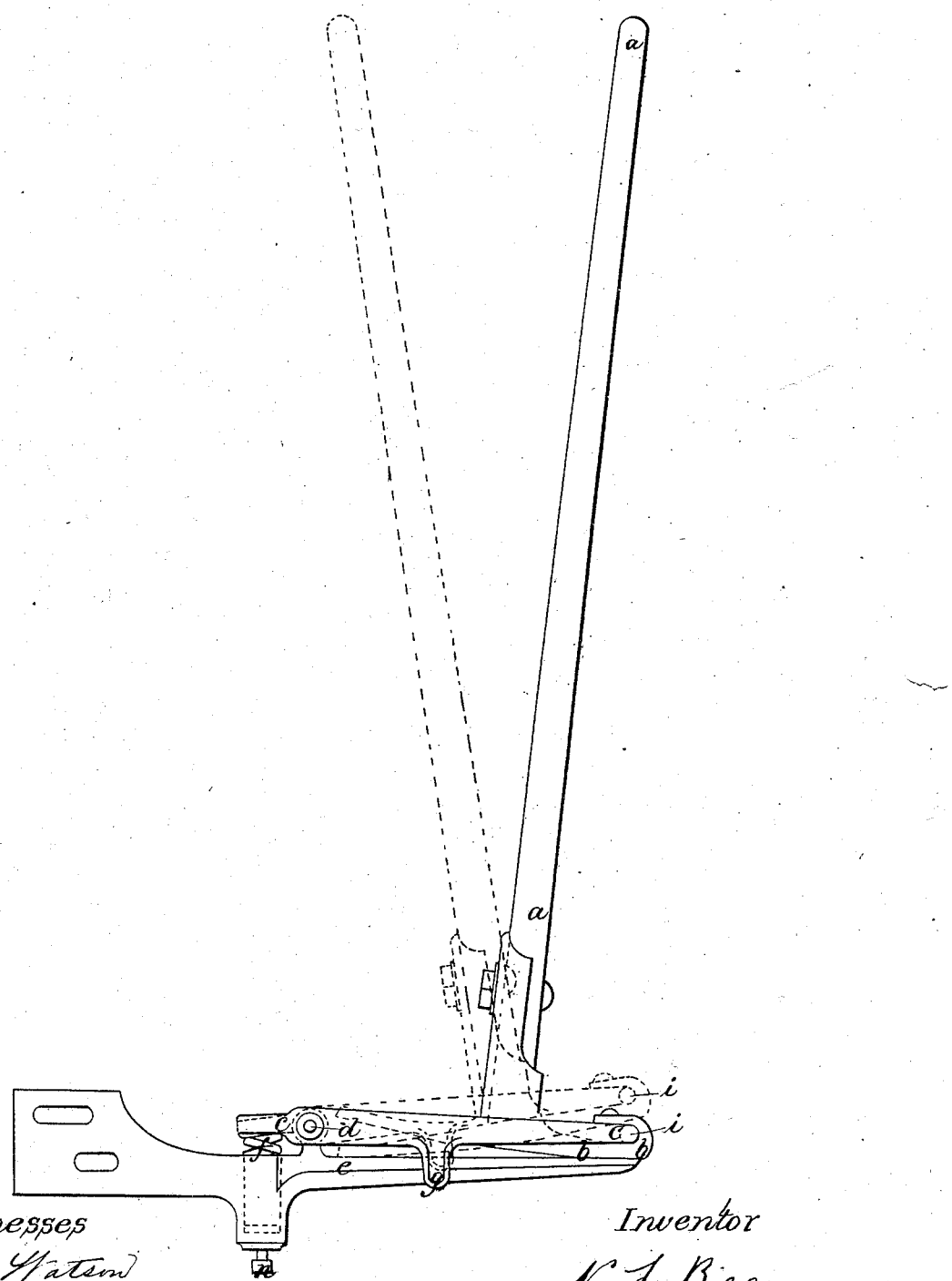

NEHEMIAH S. BEAN, OF MANCHESTER, NEW HAMPSHIRE, ASSIGNOR TO THE AMOSKEAG MANUF. COMPANY, OF SAME PLACE.

PICKER-STAFF MOTION.

Specification forming part of Letters Patent No. 31,205, dated January 22, 1861; Reissued May 28, 1867, No. 2,627.

*To all whom it may concern:*

Be it known that I, NEHEMIAH S. BEAN, of Manchester in the county of Hillsboro and State of New Hampshire, have invented certain new and useful Improvements in Picker-Staff Movements; and I do hereby declare that the following, taken in connection with the drawings which accompany and form part of this specification, is a description of my invention so full and exact as to enable those skilled in the art to practice it.

In the drawing, which embodies and illustrates my invention, $a$ represents the picker staff of a loom. This is secured to a rocker $b$ which is hinged at $i$ to the open link $c$. This link is also hinged at $d$ to the piece $e$ which is arranged to be bolted to the "lay" of a loom. The link projects beyond the pivot $d$, on which it vibrates, as shown in the drawing so that the spring $f$, can act on the short arm, considering the link as a lever. The ears $g$, which project from the link downward on each side of $e$, guide the movements of the link, and consequently those of the picker staff. The piece $e$ is provided with a pocket to receive the spring $f$, and the screw $n$ can be made to operate upon the spring to vary the force of its pressure on the link.

My invention, in common with others, is designed to produce a movement of that part of the staff to which the picker is fixed, which shall not practically vary from the line of the movement of the shuttle; and it relates to and consists in the arrangement and combination of parts whereby the rocker $b$ is kept and guided upon $e$, and by which the spring is made to operate to return the picker staff after it has moved forward to throw the shuttle. That the rocker $b$ may have such a curvature given it as to make any given point of the picker staff in vibrating move in a nearly right line is too commonly known to need description here, and the reasons why such a movement is desirable are well understood.

It will be evident on inspection of the drawings that when the picker staff is drawn forward, in the usual well known manner, by the combined action of a cam and strap, to throw the shuttle, the long arm of the link $c$ will be elevated, and the short arm thereof depressed, compressing the spring $f$. When the usual mechanism leaves the picker staff free to move back, the action of the spring on the short arm of the link causes the depression of the long arm thereof, which acting on the rocker causes the picker staff to assume a position in readiness again to throw the shuttle.

Having described by invention, what I claim and desire to secure by these Letters-Patent is—

The arrangement and combination of the rocker of the picker staff within the link and upon the piece $e$, when the rocker and link are hinged, and are operated upon by a spring, and the link is provided with guiding ears $g$, substantially in the manner described.

N. S. BEAN.

Witnesses:
 J. D. WATSON,
 A. A. BALCH.